United States Patent
Kanapathipillai et al.

(10) Patent No.: US 7,313,682 B2
(45) Date of Patent: Dec. 25, 2007

(54) METHOD AND SYSTEM FOR UPDATING BOOT MEMORY THAT STORES A FAIL-SAFE RESET CODE AND IS CONFIGURED TO STORE BOOT CODE AND BOOT UPDATER CODE

(75) Inventors: Gajendran Kanapathipillai, Ottawa (CA); Peter Cameron Dippel, Stittsville (CA)

(73) Assignee: Alcatel Lucent, Paris (FR)

( * ) Notice: Subject to any disclaimer, the term of this patent is extended or adjusted under 35 U.S.C. 154(b) by 539 days.

(21) Appl. No.: 10/835,559

(22) Filed: Apr. 29, 2004

(65) Prior Publication Data

US 2005/0246701 A1 Nov. 3, 2005

(51) Int. Cl.
*G06F 9/44* (2006.01)
(52) U.S. Cl. .......................................... 713/2; 717/168
(58) Field of Classification Search .................... 713/2; 717/168
See application file for complete search history.

(56) References Cited

U.S. PATENT DOCUMENTS 5,432,927 A 7/1995 Grote et al.
5,701,492 A 12/1997 Wadsworth et al.
2004/0039872 A1* 2/2004 Takamizawa et al. ........ 711/103

FOREIGN PATENT DOCUMENTS

EP 1 372 068 A 12/2003

OTHER PUBLICATIONS

EPO, European Search Report, Aug. 16, 2005.

* cited by examiner

*Primary Examiner*—Chun Cao
*Assistant Examiner*—Albert Wang
(74) *Attorney, Agent, or Firm*—Barnes & Thornburg LLP

(57) ABSTRACT

Electronic memory update methods, systems, and related data structures are disclosed. When a memory update is to be performed, a first section of the memory is updated to store a first software code segment, under control of a second software code segment stored in a second section of the memory. The second section of the memory is then updated under control of the first software code segment, after completion of updating the first software code segment. An incomplete update of one of the first and second sections of memory may be subsequently detected and remedied by executing the software code segment stored in the other of the first and second sections of the memory. The risk and effects of incomplete memory updates are thereby substantially reduced.

21 Claims, 4 Drawing Sheets

METHOD AND SYSTEM FOR UPDATING BOOT MEMORY THAT STORES A FAIL-SAFE RESET CODE AND IS CONFIGURED TO STORE BOOT CODE AND BOOT UPDATER CODE

FIELD OF THE INVENTION

This invention relates generally to electronic memory management, and in particular, to updating memory contents.

BACKGROUND

Many modern electronic devices enable updating of memory content such as software applications and configuration information. In the event of a power failure or some other type of interruption during an update process, memory contents might be only partially updated. A partial update may result in an inoperable software application or incomplete configuration information, for example, which may in turn render an electronic device or at least some of its functions inoperable. For this reason, so-called boot software code, and possibly other information required to support basic device operation, is usually stored in a memory device that provides persistent storage, such as a Programmable Read Only Memory (PROM).

Although such memory devices preclude subsequent updating of memory contents by writing information to the memory, boot software code stored in a PROM is not lost when a device is powered down. When power is again applied to the device, the boot software code loads a software application into Random Access Memory (RAM), for example, and a processor in the device executes the software application, bringing the device into normal operation. This type of startup sequence is typical of such devices as circuit cards in telecommunication switches, in which relatively few software applications define the functionality of the device. To some extent, this sequence is also common to other types of devices, including computer systems, in which boot software code is executed upon device power up or reset.

The use of a read-only store for boot software code and possibly other information thereby effectively eliminates the possibility of an incomplete update of such information, which may result in a "dead" device. Even though the hardware of such a device may remain intact, a dead device is unable to execute recovery operations or even core startup operations if boot software code, for instance, is incomplete.

One disadvantage associated with such read-only storage, however, is that updating of memory contents is inconvenient. For example, if a new software application requires an update of boot software code, then a new physical memory device programmed with the updated boot software code must be installed in a device before the new software application can be executed. This equipment maintenance scheme becomes particularly time consuming and costly when many devices must be updated, as in the case of circuit cards or other common and widely deployed equipment.

An alternative update technique is typically used for software applications on electronic devices. Often, two banks of FLASH Electrically Erasable PROM (EEPROM) are provided for storing software applications, and each bank stores an entire copy of the same software application. However, the software application in only one of the banks, referred to as the active bank, is executed at a given time. The other bank is generally referred to as the inactive bank.

In accordance with normal application update procedures, the software application is updated first in the inactive bank, and responsive to the update being successful, execution is switched over to that bank before the software application in the other bank is updated. This approach allows a software application to be updated with minimal risk of affecting the operation of the device. If an update operation is interrupted before completion, the software application remains in the active bank.

Implementation of this type of redundancy model for boot software code would require additional hardware, specifically a second memory device for boot software code, since only a single boot PROM is normally provided in an electronic device. A second memory device not only adds cost, but also increases power consumption, heat generation, and physical space requirements, and may therefore not be feasible in some types of device.

Another possible option to facilitate boot software code updating is to store boot software code in an erasable and programmable memory device such as an EEPROM. After a device has executed boot software code and is operational, additional functionality supported on the device could then erase the EEPROM and reload new boot software code into the EEPROM. However, if a power outage, card pull in the case of a circuit card, load corruption, or other such event occurs during reloading of boot software code, then the reload fails and the device is no longer able to start up from its boot EEPROM.

SUMMARY OF THE INVENTION

Embodiments of the invention allow updating of content in memory on electronic devices, while reducing the risk of corruption.

In a preferred embodiment, boot software code is updateable with significantly lower likelihood of incomplete or otherwise incorrect updates due to a power outage or other interruption during an update process affecting subsequent operation of an electronic device.

A method of updating contents of an electronic memory is provided in accordance with an aspect of the invention. The method includes determining whether a memory update is to be performed, updating a first section of the memory to store a first software code segment, under control of a second software code segment stored in a second section of the memory, where a memory update is to be performed, and updating the second section of the memory, under control of the first software code segment, after completion of updating the first software code segment.

The determination as to whether a memory update is to be performed may included determining whether a first software code segment is stored in the first section of the memory. A memory update is to be performed where the first software code segment is not stored in the first section of the memory.

According to an embodiment of the invention, a further determination is made as to whether the second software code segment is stored in the second section of the memory. The second section of the memory is the updated, under control of the first software code segment, where the second software code segment is not stored in the second section of the memory.

These determinations may be made by determining whether predetermined memory locations within the first and second sections of the memory are empty. In some embodiments, this type of determination is facilitated by an update sequence of erasing the first section of the memory, copying portions of a first software code segment image from memory locations in a further memory to memory locations in the first section of the memory other than the predetermined memory location, and copying a remaining portion of the first software code segment image from a memory location in the further memory to the predetermined memory location. The second section of the memory may be updated in a similar manner.

In a preferred embodiment, the first section of the memory and the second section of the memory include respective groups of sectors of the memory. The predetermined memory locations within the first and second sections of the memory may, for example, be a first sector in each of the first and second sections of the memory.

Methods according to embodiments of the invention may be applied to boot software for an electronic device. In this case, the second software code segment may be boot software code, and the first software code segment may be boot updater software code for updating the boot software code. The boot software code may include a standard reset software code segment, a loader software code segment, and a boot application, for instance. A further code segment, such as a fail-safe reset code segment, may be stored in a third section of the memory and provide basic boot functions.

The function of determining whether an update is to be performed may also involve determining whether an update flag has been set. The update flag may be set in a non-volatile memory, for example, when an image of a new first software code segment or an image of a new second software code segment are received. Setting of the update flag may instead be dependent upon determining that the new first software code segment image and the new second software code segment image are not identical to a first software code segment and a second software code segment stored in the memory. In one embodiment, a software application bundled with the new first software code segment image and the new second software code segment image.

Any of the above methods and operations may be embodied in computer-readable instructions on a computer-readable medium.

An electronic device is also provided. The device may include a memory for storing a first software code segment and a second software code segment and a processor configured to determine whether an update of the memory is to be performed, to update a first section of the memory to store a first software code segment, under control of a second software code segment stored in a second section of the memory, where a memory update is to be performed, and to update the second section of the memory, under control of the first software code segment, after completion of updating the first software code segment.

In another aspect, the invention also provides a method of updating a boot memory in an electronic device. The boot memory stores a fail-safe reset software code and is configured to store a boot software code segment and a boot updater software code segment. The fail-safe reset software code segment is first executed to determine whether the boot software code segment is stored in the boot memory. If the boot software code segment is not stored in the boot memory, then the boot updater software code segment is executed to update the boot memory to store the boot software code segment. The boot software code segment is executed, when it is already stored in the boot memory or after the boot memory is updated, to determine whether the boot updater software code segment is stored in the boot memory. The boot memory is then updated to store the boot updater code segment where the boot updater software code segment is not stored in the boot memory, and to boot the electronic device where the boot updater software code segment is stored in the boot memory. The boot software code segment may also determine whether a boot update is to be performed and if so, updates the boot memory to store the boot updater software code segment, which is then executed.

There is also provided a computer-readable medium storing a data structure, the data structure including a first software code segment and a second software code segment. The second software code segment includes computer-readable instructions which when executed determine whether the first software code segment is valid and update the first software code segment where the first software code segment is not valid. The first software code segment comprises computer-readable instructions which when executed update the second software code segment. In one embodiment, the data structure also includes a third software code segment which includes computer-readable instructions which when executed determine whether the second software code segment is valid and cause the first software code segment to be executed where the second software code segment is not valid.

Other aspects and features of embodiments of the present invention will become apparent to those ordinarily skilled in the art upon review of the following description of the specific embodiments of the invention.

BRIEF DESCRIPTION OF THE DRAWINGS

Examples of embodiments of the invention will now be described in greater detail with reference to the accompanying drawings, in which.

DETAILED DESCRIPTION OF PREFERRED EMBODIMENTS

Figure 1:
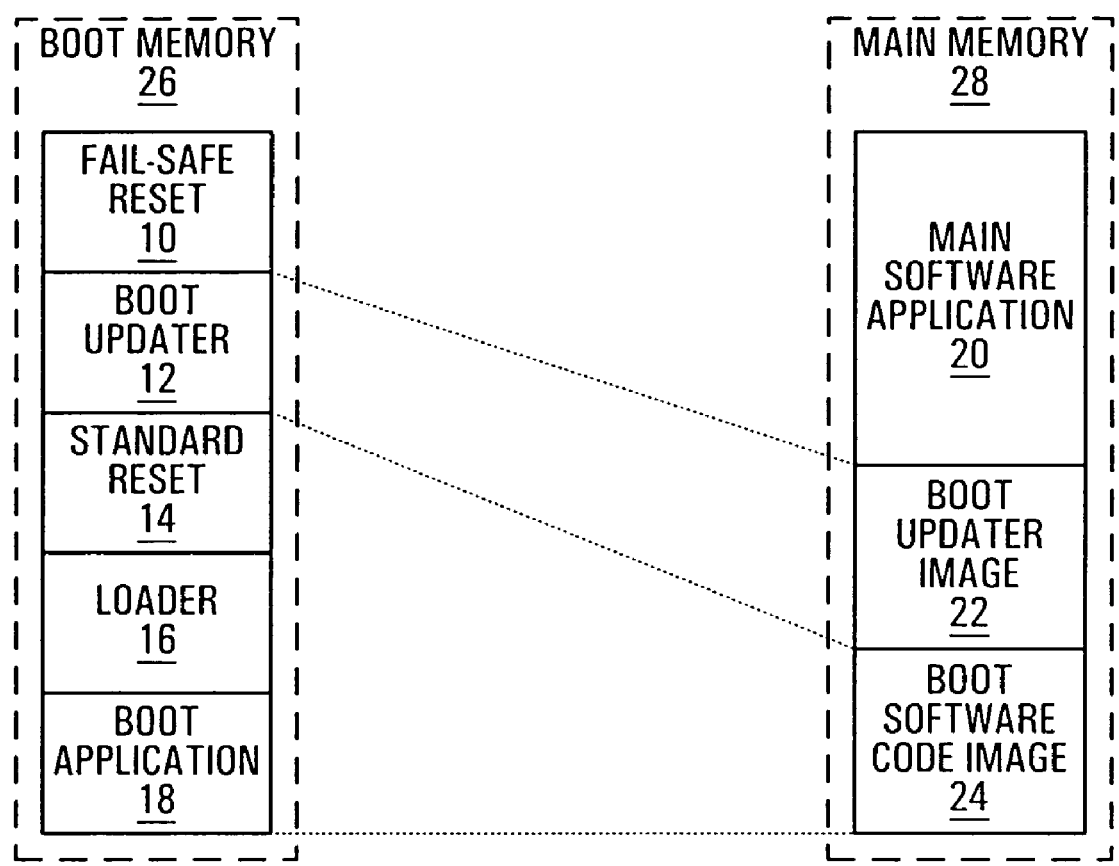
FIG. 1 is a block diagram of a memory arrangement and data structure in accordance with an embodiment of the invention.

FIG. 1 is a block diagram of a memory arrangement and data structure in accordance with an embodiment of the invention. It should be appreciated that only memory components and contents which are relevant to the particular illustrated embodiment of the invention have been shown in FIG. 1, and that the invention is in no way limited thereto. For example, memory update techniques according to embodiments of the present invention may be implemented with different numbers of memory devices storing fewer, further, or different types of content than explicitly shown in FIG. 1.

The boot memory 26 includes a fail-safe reset 10, a boot updater 12, a standard reset 14, a loader 16, and a boot application 18. Each of the elements 10, 12, 14, 16, 18 is preferably a software code segment for execution by a processor to perform functions described in further detail below. The boot memory 26 is preferably a dedicated writable but non-volatile memory, such as a Flash memory device, for example, but may instead be implemented within a larger memory device.

As reset or startup operations, which may be referred to generally as boot operations, are dependent upon the contents of the boot memory 26, access to the boot memory 26 is preferably controlled, particularly where the boot memory 26 is implemented in a larger memory device that may also be used to store other information. For example, the boot memory 26 may be write-protected using a memory management unit of a processor in an electronic device. During an update, the processor is re-configured to allow read-write access to the boot memory 26. This prevents any accidental updates to the PROM during normal use, but not intentional updates. In another embodiment, only the boot updater 12 and the loader 16 have write access to the boot memory 26. Such controlled access may thus prevent or reduce inadvertent or unauthorized erasure or over-writing of any of the contents of the boot memory 26.

The main memory 28, also preferably a writable and non-volatile memory device, stores a boot updater image 22 and a boot software code image 24. As indicated in FIG. 1, the boot updater image 22 is an image, such as a basic binary image, of the boot updater 12. Similarly, the boot software code image 24 is an image of the standard reset 14, the loader 16, and the boot application 18. The main memory 28 also stores a main software application 20. In a preferred embodiment, the boot updater image 22 and the boot software code image 24 are bundled together with the main software application 20 such that any devices on which the main software application 20 is to be installed will also have access to correct boot software code. Although this type of bundled software application may be preferred for implementation in conjunction with devices configured to execute a single software application, it should be appreciated that the images 22 and 24 need not necessarily be stored or associated with any particular software application in other embodiments of the invention.

A memory arrangement and data structure such as shown in FIG. 1 support updating of boot software code, in the field, from boot software code images. The boot software code images may optionally be supplied with an application software bundle and stored in the main memory 28. This update capability significantly reduces the frequency of physical boot software code memory device replacement when boot software is to be upgraded or otherwise changed. As described above, physical memory device upgrades tend to be time consuming and costly.

The inherent risk of an incomplete or unsuccessful update of boot software code is significantly reduced by separately storing and updating software code segments of boot software code. At least one code segment which provides basic boot functionality, the fail-safe reset 10 of FIG. 1, is preferably not updateable in order to ensure that an interrupted or incomplete update of boot software code does not result in a dead device. Other code segments are updated in a manner according to an embodiment of the invention, as described in further detail below, with update verification to detect and rectify incomplete boot software code updates.

The boot memory 26 is preferably a memory device having independently erasable sections or sectors. Each sector may be 512 bytes in size, for example. Such memory devices typically have two erase modes, including a chip-erase mode, which erases the entire memory device using a single command, and a sector-erase mode, which allows the memory device to be erased sector by sector. In many memory devices of this type, all of the bits in an erased sector are set to a value of 1, which provides for detection that a sector has been erased (i.e., that it is empty). Embodiments of the present invention exploit a sector-erase or analogous memory device feature to reduce the effects of incomplete memory content updates.

In accordance with an aspect of the invention, software code segments of a boot load, including the fail-safe reset 10, the boot updater 12 and boot software code in the example of FIG. 1, are stored in distinct, non-overlapping, and independently erasable sectors of the boot memory 26. In one embodiment, at least the boot updater 12 and the standard reset 14 are stored in separate respective groups of one or more sectors. The loader 16 and the boot application 18 are either also stored in respective groups of sectors or appended to the standard reset 14. As all of the software code segments 14, 16, 18 are included in the same boot software code image 24 in FIG. 1, these software code segments need not necessarily be erasable separately from each other. However, it should be appreciated that software code segments that are to be separately updateable are preferably stored in respective separately erasable portions of memory. Thus, for arrangements in which each code segment is to be separately updateable for instance, each code segment is stored in a respective group of one or more sectors.

Those skilled in the art will appreciate that memory space requirements for the software code segments shown in FIG. 1 will rarely if ever be exactly an integer multiple of sector size. As such, a group of sectors in which separately updateable code segments are stored may include partially empty sectors. Alternatively, partially used sectors may be padded or stuffed.

The fail-safe reset 10 is executed at startup or after a reset. This software code segment may be loaded into the boot memory 26 by a device manufacturer or software provider, for example, along with an initial boot load. An initial boot load preferably includes at least one of the boot updater 22 and boot software code comprising the standard reset 14, the loader 16, and the boot application 18. Whereas other code segments in a boot load are updateable in accordance with an aspect of the invention, the fail-safe reset 10 is preferably not updateable by writing to the boot memory 26. In order to make any changes to the fail-safe reset 10, the boot memory 26 must be changed.

It will therefore be apparent that the fail-safe reset 10 is protected from incomplete updates. This code segment may be stored in a protected memory location in the boot memory 26 that is addressable only by a device processor at device startup, in a read-only memory location in the boot memory 26, or possibly in a separate read-only or protected memory device, for example. The fail-safe reset 10 preferably provides minimal boot functionality, to reduce the likelihood that it would ever need to be changed.

Figure 2:
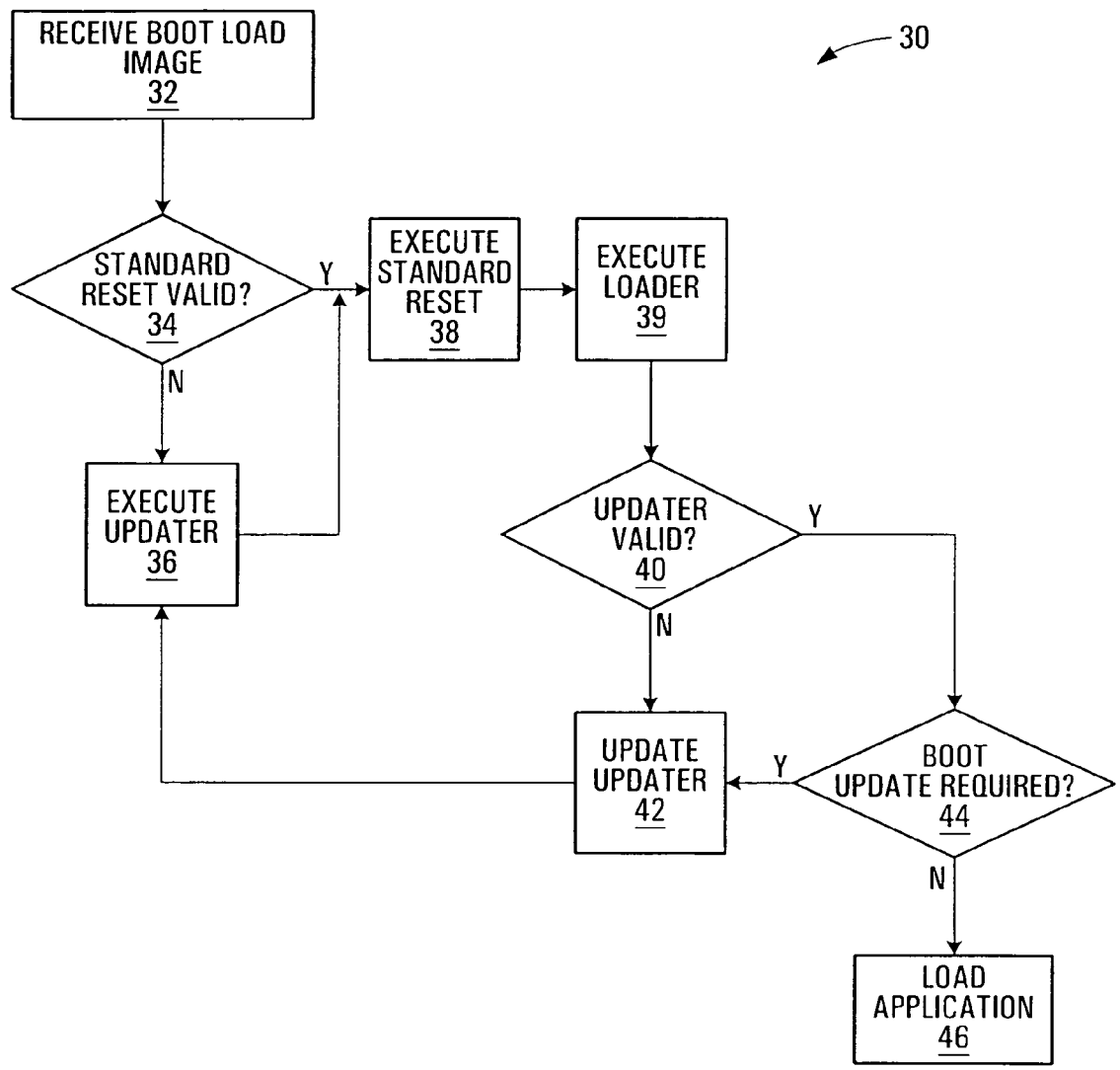
FIG. 2 is a flow diagram of a method according to an embodiment of the invention.

Operation of the fail-safe reset 10 and the other software code segments shown in FIG. 1 will be described below with reference to both FIGS. 1 and 2. FIG. 2 is a flow diagram of a method 30 according to an embodiment of the invention.

At 32, a boot load image is received. A boot load image may include a boot software code image 24 and possibly a boot updater image 22. As described above, a boot load may be received with a software application 20 in an application bundle.

The received boot load image is subsequently used to update a boot load currently stored in the boot memory 26. In the embodiment shown in FIG. 2, updating of the boot memory 26 is performed the next time a device is booted, since boot software code is generally only executed during a boot operation and thus boot load updates would take effect only after a subsequent boot operation. However, it should be appreciated that memory updates may be performed at other times, when other types of memory content than a boot load are to be updated, for example.

When booting, after a device has been reset or is powered on at 32, the fail-safe reset 10 determines at 34 whether a first section of the boot memory 26, which may include one or more sectors, stores a valid standard reset 14. This determination may be made, for example, by determining whether a predetermined memory location within the first section is empty. In one embodiment, a first sector of the first section of the boot memory 26 is read. If the first sector includes all 1's, a null value, or some other data pattern indicative of an erased memory sector, then a valid standard reset 14 is not stored in the first section of the memory 26. According to other embodiments, a first instruction, another predetermined portion of the standard reset 14, or a separate flag or indicator associated with the standard reset 14 is checked to determine whether a valid standard reset 14 exists in the boot memory 26.

If a valid standard reset 14 is not found, due to a failed boot software code update, for example, then the boot updater 12 is executed at 36 to force an update of the boot software code from the boot software code image 24 in the main memory 28, which includes the standard reset 14, the loader 16, and the boot application 18.

The boot updater 12 preferably erases the first section the boot memory 26 in which the boot software code image 24 is to be stored. This erase operation, which may be performed on a sector-by-sector basis, erases only the software code segments currently being updated without affecting other code segments, the fail-safe reset 10 and the boot updater 12 in this example. The boot updater 12 then loads boot software code from the boot software code image 24 into the boot memory 26.

Although the boot software code image 24 is preferably an exact copy of boot software code to be stored in the boot memory 26, it will be apparent to those skilled in the art that the image 24, and similarly the boot update image 22, may be a compressed or otherwise processed version of one or more software code segments. The image is then appropriately processed to update the corresponding software code segments in the boot memory 26.

In a preferred embodiment, image loading begins with the second sector of the boot software code image 24 being written to a second sector of a section of the memory 26 in which the boot software code is to be stored. When the second through last sectors of the boot software code image 24 have been loaded into the boot memory 26, the first sector of the boot software code image is written to the first sector of the boot software code section of the boot memory 26. In the example structure in FIG. 1, the first sector of the boot software code is a first sector of the standard reset 14.

This update procedure ensures that an incomplete update of boot software code from the image 24 can be detected during a subsequent boot operation. In the event of a power failure or other interruption while the second through last sectors of the image 24 are being loaded, the first sector of the standard reset 14 would remain empty, which is detected by the fail-safe reset 10, and the boot updater 12 is executed again. A failed or otherwise incomplete update thereby does not render a device inoperable. Boot software code updates may be re-tried until successful, or possibly a predetermined number of times, after which error or failure processing may be performed.

It should be appreciated that the above sequence of writing second through last sectors followed by a first sector is intended for illustrative purposes, and that the invention is in no way limited thereto. This update sequence is advantageous in that an indication of update failure is inferable from a data structure, in particular from a first sector of memory contents being updated. However, other types of indicators or determination techniques are also possible, including such explicit indicators as flags associated with boot software code segments or memory sections or sectors.

Referring again to FIG. 2, when a valid standard reset 14 is detected at 34, or after the standard reset 14 has been updated at 36, it is executed at 38. The fail-safe reset 10 thus determines whether the standard reset 14 is valid, and causes either an update or execution thereof. In one embodiment, the fail-safe reset 10 is executed by a device processor, and instructs the device processor to execute either the boot updater 12 or the standard reset 14. For example, the fail-safe reset 10 may return to the processor a memory pointer or address corresponding to either the boot updater 12 or the standard reset 14, depending upon the determination at 34.

The standard reset 14 performs such functions as initializing a device processor, chip selects, cache, etc., before (the loader 16 is executed. After this initialization is complete, the loader 16 is executed at 39.

One function of the loader 16 is to choose between the boot application 18 and the main application 20. This selection may be set in hardware, such as by a jumper on a card, or in software, using a field or flag in non-volatile memory, for instance. Either of these two applications may be loaded by the loader 16 into RAM for execution by a processor. The operations at 40, 42, and 44 in FIG. 2 represent additional functionality provided by the loader 16 according to an aspect of the invention.

The loader 16 first determines at 40 whether the boot updater 12 is valid, for example by verifying that the first sector of the boot updater 12 is a non-empty sector. If the boot updater 12 is not valid, then the loader 16 updates the boot updater 12 at 42, by erasing the section in the boot memory 26 in which the boot updater 12 is stored and loading the boot updater from the boot updater image 22 into the erased section of the boot memory 26. The boot updater image 22 is preferably copied from the main memory 28 and written into the boot memory 26 starting with the second sector of the boot updater image 22. The first sector of the boot updater image 22 is then written into the boot memory 26. As above, a non-empty first sector indicates a successful update. The updated boot updater is then executed at 36 and updates the boot software code substantially as described above.

At 44, the loader 16 determines whether a boot update is to be performed. In a situation where the boot the updater 12 was updated at 42, executed at 36, and an update was completed, the determination at 44 will be negative. Otherwise, the boot updater 12 is updated at 42 and executed at 36, substantially as described above. For implementations in which an update is performed at boot time, the operation at 44 triggers a memory update. In this situation, a boot update image has been received and stored but not yet used to update a current boot load in the boot memory 26.

The determination at 44 may be based, for example, upon whether an "update boot" or similar flag has been set in a non-volatile memory on a device in which the memory arrangement of FIG. 1 has been implemented. Boot updates are then invoked on a subsequent reset by setting the update boot flag. For example, the update boot flag may be set when a new boot updater image and a new boot software code image are received at a device and stored in the main memory 28. If an immediate update is required or desired, the device may also be reset. Otherwise, an update will be performed on a next reset. In embodiments where such a flag is used to trigger a boot update, then the flag is reset by the boot updater 12 upon completion of a boot software code update at 36.

In one embodiment, an application or operating system software running on a device detects that new boot software code has been received by the device, sets the update boot flag, and preferably resets the device. According to another embodiment, boot images are bundled with a new application. During an initial startup of a new application, the application compares the boot updater and boot software code currently stored in the boot memory 26 with its bundled images to determine whether an update is necessary. If an update is required, then the application sets the update boot flag and resets the device.

If it is determined at 44 that no boot update is required, then at 46 the loader 16 loads either the main application 20 or the boot application 18 for execution, as described above.

FIGS. 1 and 2 are intended solely for illustrative purposes, and not to limit the scope of the present invention. Embodiments of the invention may be implemented with further, fewer, or different memory sections and method steps, and in conjunction with different types of memory content. For example, immediate memory content update may be provided by proceeding to 44 from 32 in FIG. 2. A new boot load may thereby trigger a substantially immediate boot update, and iteration of the operations at 34-44 during subsequent boot operations verify that the update was successful or repeat the update if necessary.

Figure 3:
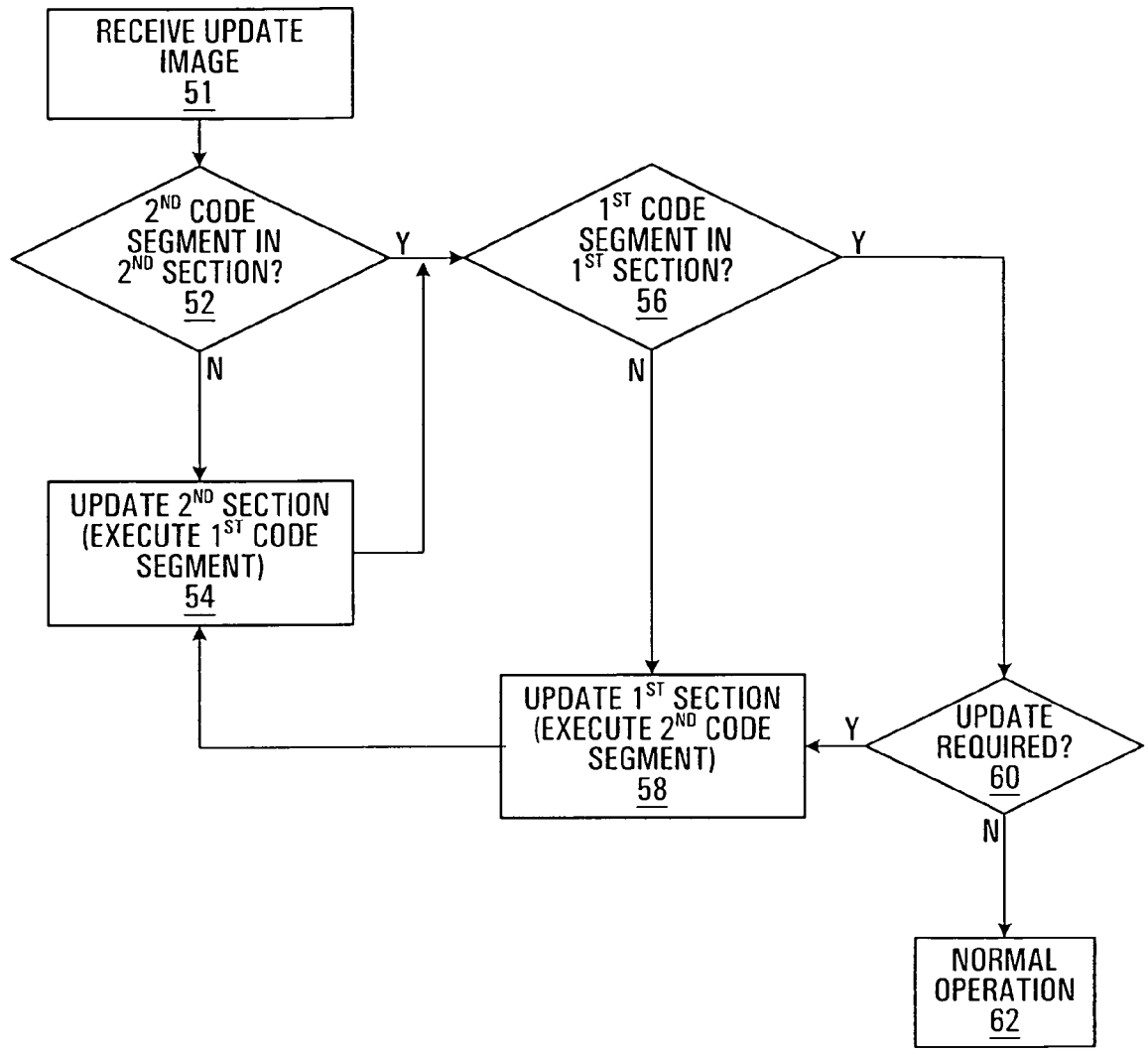
FIG. 3 is a flow diagram of a method according to another embodiment of the invention.

FIG. 3 is a flow diagram of a method 50 according to another embodiment of the invention, and provides a more generalized representation of a memory update method. From a comparison of FIGS. 2 and 3, it will be apparent that the first and second software code segments in FIG. 3 are analogous to the boot updater and boot software code, respectively, described above.

In FIG. 3, the method begins at 51, when an update image, representing information to be used in updating memory contents, is received. The method then proceeds to update the memory contents from the update image. As described above, updating may be started substantially immediately or at some later time after an update image is received, when a device is reset, for example.

At 52, a determination is made as to whether a second section of the memory stores a second software code segment. The standard reset 14, the loader 16, and the boot application 18 in FIG. 1 may be considered a second software code segment, and the section of the boot memory 26 in which these elements are stored, which may include one or more sectors, represents a second memory section.

If the second section of the memory does not store the second software code segment, then the second section of the memory is updated at 54 to store the second software code segment. This update is performed under control of a first software code segment, illustratively the boot updater 12, stored in a first section of the memory.

It is then determined at 56 whether the first section of the memory stores the first software code segment, and if not, the first section of the memory is updated at 58 to store the first software code segment, under control of the second software code segment.

The determination at 60 may be based on an update boot flag, for example, as described above. At 62, normal device operation proceeds, with loading and execution of a software application, for instance.

As will be apparent from FIG. 3, the first and second software code segments represent independently updateable software code segments, of which only one is updated at any time. A valid one of these software code segments is executed and may update the other. In a preferred embodiment, the second software code segment is an operating software code segment such as boot software code supporting at least booting of an electronic device, and the first software code segment is an update module such as the boot updater 12 for updating the operating software code segment.

Figure 4:
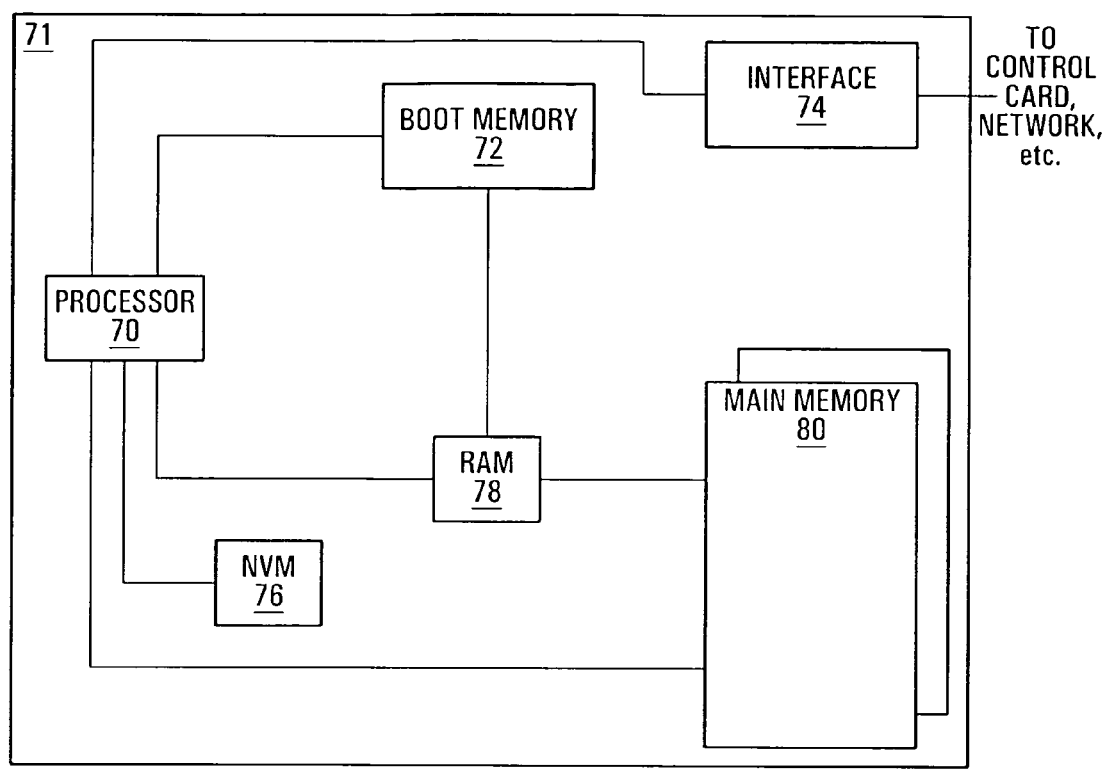
FIG. 4 is a block diagram of a system in which an embodiment of the invention may be implemented.

FIG. 4 is a block diagram of a system in which an embodiment of the invention may be implemented. It should be appreciated that FIG. 4 is intended solely for illustrative purposes, and that the invention is in no way limited to implementation in systems which include the specific components shown in FIG. 4. For example, electronic device components which might not be directly involved in updating memory contents have not been shown. An electronic device may include further, fewer, or different components with different interconnections than shown in FIG. 4. The components shown in FIG. 4 may also be used for functions other than memory content updating, as will be apparent to those skilled in the art.

The system of FIG. 4 includes a processor 70 connected to an interface 74, a boot memory 72, a RAM 78, a non-volatile memory (NVM) 76, and a main memory 80. These components are preferably implemented in an electronic device 71, such as a computer system or a circuit card, for instance.

The processor 70 is preferably a microprocessor configured to execute a boot load in the boot memory 72 at startup, such as after a reset or when power is applied, as well as operating system software, software applications, and possibly other software. The memory update operations described above are preferably implemented in a boot load and performed by the processor 70 when software code segments of the boot load are executed.

Communications may be established with external systems and devices through the interface 74, which may vary depending upon the type of device 71 and the type of communications to be supported. In one embodiment, the interface 74 is a backplane connector in a circuit card rack, through which the device 71, a circuit card in this example, exchanges information with a control card and possibly other cards. The interface 74 may instead include connectors for wired communication links or wireless communication modules. In other embodiments, more than one type of interface 74 may be provided.

Examples of suitable memory components for the memories 72, 76, 78, 80 have been described above. As shown, the main memory 80 preferably includes multiple memory devices, as in the case of redundant application memories, for example. Although the RAM 78 is shown as being connected to the boot memory 72 and the main memory 80, those skilled in the art will appreciate that data transfer between the RAM 78 and the other memory elements may actually be accomplished through the processor 70.

In operation, a boot update image is received through the interface 74 and written to the main memory 80, such as to an inactive memory bank, by the processor 70. The device 71 may also support direct memory access by the interface 74. The transfer of a boot update image to the device 71 may be accomplished using any of a number of different mechanisms. Data formatting, for example, varies with the type of the interface 74 and the protocols supported by the device 71. However, a secure mechanism might be preferred in order to prevent software code updates by other than authorized parties. Encryption, authentication, and other security measures may be used to provide for secure transfer of information, verification of authorization to update memory contents on the device 71, or both.

When a boot update image is received by the device 71, an update boot flag is preferably set in the NVM 76 to trigger an update of a current boot load in the boot memory 72. As described above, this flag may be set by a currently running application or operating system software when receipt of the boot update image is detected. In the case of a boot update image bundled with a software application, the software application may determine whether an existing boot load in the boot memory 72 is the same as its bundled boot update image. Where an update is required, the update boot flag is then set in the NVM 76 and the device 71 may be reset.

According to another embodiment of the invention, the device 71 or an external device with which the device 71 may communicate provides a user interface through which a boot load update may also be initiated. A control terminal for a circuit card rack installation may provide a command line interface or graphical user interface, for example, using which an update command may be entered or selected. A boot update image may be transferred to the device 71, the update boot flag may be set in the NVM 76, and the device may be reset in response to such a command.

The next time the device 71 boots, the processor 70 executes the fail-safe reset, the boot updater, and other boot software code substantially as described above to update the boot load in the memory 72. If a boot update flag is used to invoke an update, then the boot update flag is preferably reset upon completion of the update. As described briefly above, a further flag in the NVM 76 may determine whether a boot application or a main application is loaded into the RAM 78 during a device boot.

The memory content update techniques described above save operation and maintenance costs by providing for remote update of a boot load, or at least portions thereof, without replacing boot memory devices. These techniques also increase system availability by reducing the risks associated with remote memory update failures.

What has been described is merely illustrative of the application of the principles of the invention. Other arrangements and methods can be implemented by those skilled in the art without departing from the present invention.

For example, other divisions of functions and code segments are possible, such as to further partition or segregate memory contents into more than two independently updateable sections. The invention is also in no way restricted to the specific division of boot functions described above, or exclusively to boot software code.

In addition, although described above primarily in the context of memory updating, embodiments of the invention may be operable with less than a complete boot load, for instance. An initial boot software code load may include only a fail-safe software code segment and one of an updater and boot software code. The absent boot software code or updater may then be loaded from another memory, such as from a software application bundle in an application memory bank.

It should also be appreciated that implementation of the invention preferably does not preclude components of an electronic device from performing other functions and operations. Referring to FIG. 4, for example, the processor 70 may execute software applications and operating system software, the interface 74 may enable the device 71 to exchange other types of information than boot update images and software applications with other devices and systems, and at least the memories 76, 78, 80 may store other types of information than flags, software applications, and boot update images, including user data and application data.

We claim:

1. An electronic device comprising:
    a boot memory for storing a fail-safe reset software code segment, a boot updater software code segment and a boot software code segment; and
    a processor configured to execute the fail-safe reset software code segment to determine whether the boot software code segment is stored in the boot memory, to execute the boot updater software code segment to update the boot memory to store the boot software code segment where the boot software code segment is not stored in the boot memory, and to execute the boot software code segment to determine whether the boot updater software code segment is stored in the boot memory, to update the boot memory to store the boot updater code segment where the boot updater software code segment is not stored in the boot memory, and to boot the electronic device where the boot updater software code segment is stored in the boot memory.

2. The electronic device of claim 1, wherein the boot software code segment determines whether the boot updater software code segment is stored in the boot memory by determining whether a predetermined memory location within a first section of the boot memory is empty.

3. The electronic device of claim 1, wherein the boot software code segment comprises a standard reset software code segment and a loader software code segment, wherein the standard reset software code segment causes the processor to perform initialization operations, and wherein the loader software code segment causes the processor to determine whether the boot updater software code segment is stored in the boot memory.

4. The electronic device of claim 1, further comprising:
    a non-volatile memory for storing an update flag,
    wherein the fail-safe reset software code determines whether the boot software code segment is stored in the boot memory by determining whether the update flag is set.

5. The electronic device of claim 1, further comprising:
    a main memory configured to store an image of a new boot updater software code segment and an image of a new boot software code segment,
    wherein the boot software code segment updates the boot memory by writing the new boot updater software code segment to the boot memory, and wherein the boot updater software code updates the boot memory by writing the new boot software code segment to the boot memory.

6. A method of updating a boot memory in an electronic device, the boot memory storing a fail-safe reset software code segment and being configured to store a boot software code segment and a boot updater software code segment, comprising:
    executing the fail-safe reset software code segment to determine whether the boot software code segment is stored in the boot memory;
    executing the boot updater software code segment to update the boot memory to store the boot software code segment where the boot software code segment is not stored in the boot memory; and
    executing the boot software code segment to determine whether the boot updater software code segment is stored in the boot memory, to update the boot memory to store the boot updater code segment where the boot updater software code segment is not stored in the boot memory, and to boot the electronic device where the boot updater software code segment is stored in the boot memory.

7. The method of claim 6, wherein the boot software code segment determines whether the boot updater software code segment is stored in the boot memory by determining whether a predetermined memory location within a first section of the boot memory is empty.

8. The method of claim 7, wherein the boot software code segment updates the boot memory by:
erasing the first section of the boot memory;
copying portions of a boot updater software code segment image from memory locations in a further memory to memory locations in the first section of the boot memory other than the predetermined memory location; and
copying a remaining portion of the boot updater software code segment image from a memory location in the further memory to the predetermined memory location.

9. The method of claim 7, wherein the fail-safe reset software code segment determines whether the boot software code segment is stored in the boot memory by determining whether a predetermined memory location within a second section of the memory is empty.

10. The method of claim 9, wherein the boot updater software code updates the boot memory by:
erasing the second section of the boot memory;
copying portions of a boot software code segment image from memory locations in a further memory to memory locations in the second section of the boot memory other than the predetermined memory location in the second section; and
copying a remaining portion of the boot software code segment image from a memory location in the further memory to the predetermined memory location in the second section.

11. The method of claim 10,
wherein the boot software code segment updates the boot memory by:
erasing the first section of the boot memory;
copying portions of a boot updater software code segment image from memory locations in the further memory to memory locations in the first section of the boot memory other than the predetermined memory location in the first section of the boot memory; and
copying a remaining portion of the boot updater software code segment image from a memory location in the further memory to the predetermined memory location in the first section of the boot memory.

12. The method of claim 11, wherein the first section of the boot memory and the second section of the boot memory comprise respective groups of sectors of the boot memory, wherein the predetermined memory location within the first section of the boot memory comprises a first sector in the first section of the boot memory, and wherein the predetermined memory location within the second section of the boot memory comprises a first sector in the second section of the boot memory.

13. The method of claim 6, wherein the boot software code comprises a standard reset software code segment, a loader software code segment, and a boot application.

14. The method of claim 13, wherein the standard reset software code segment performs initialization operations, and wherein the loader software code segment determines whether the boot updater software code segment is stored in the boot memory.

15. The method of claim 6, wherein the fail-safe reset software code determines whether the boot software code segment is stored in the boot memory by:
determining whether an update flag is set.

16. The method of claim 15, further comprising:
receiving an image of a new boot updater software code segment and an image of a new boot software code segment; and
setting the update flag,
wherein the boot software code segment updates the boot memory by writing the new boot updater software code segment to the boot memory, and wherein the boot updater software code updates the boot memory by writing the new boot software code segment to the boot memory.

17. The method of claim 16, further comprising:
determining whether the new boot updater software code segment image and the new boot software code segment image are identical to a boot updater software code segment and a boot software code segment stored in the boot memory,
wherein setting the update flag comprises setting the update flag where the new boot updater software code segment image and the new boot software code segment image are not identical to the boot updater software code segment and the boot software code segment stored in the boot memory.

18. The method of claim 17, wherein receiving comprises receiving a software application bundled with the new boot updater software code segment image and the new boot software code segment image.

19. The method of claim 18, wherein the software application performs the steps of determining whether the new boot updater software code segment image and the new boot software code segment image are identical to the boot updater software code segment and the boot software code segment stored in the boot memory and setting the update flag.

20. The method of claim 6, wherein the boot software code segment further determines whether a boot update is to be performed and updates the boot memory to store the boot updater software code segment where a boot update is to be performed.

21. A computer-readable medium storing instructions which when executed perform a method of updating a boot memory in an electronic device, the boot memory storing a fail-safe reset software code segment and being configured to store a boot software code segment and a boot updater software code segment, the method comprising:
executing the fail-safe reset software code segment to determine whether the boot software code segment is stored in the boot memory;
executing the boot updater software code segment to update the boot memory to store the boot software code segment where the boot software code segment is not stored in the boot memory; and
executing the boot software code segment to determine whether the boot updater software code segment is stored in the boot memory, to update the boot memory to store the boot updater code segment where the boot updater software code segment is not stored in the boot memory, and to boot the electronic device where the boot updater software code segment is stored in the boot memory.

* * * * *